United States Patent
Miller et al.

(10) Patent No.: US 9,377,767 B2
(45) Date of Patent: Jun. 28, 2016

(54) APPARATUS FOR DATA SIGNAL TRANSMISSION THROUGH POWER CONNECTION

(75) Inventors: Garret Miller, Owatonna, MN (US);
Phillip McGee, Owatonna, MN (US);
Lee Robert Klose, Portage, MI (US)

(73) Assignee: Bosch Automotive Service Solutions U.S. LLC, Warren, MI (US)

(*) Notice: Subject to any disclaimer, the term of this patent is extended or adjusted under 35 U.S.C. 154(b) by 652 days.

(21) Appl. No.: 13/408,366

(22) Filed: Feb. 29, 2012

(65) Prior Publication Data
US 2013/0226483 A1    Aug. 29, 2013

(51) Int. Cl.
*G01R 21/00*    (2006.01)
*G05B 19/042*    (2006.01)

(52) U.S. Cl.
CPC .. *G05B 19/0423* (2013.01); *G05B 2219/24048* (2013.01); *G05B 2219/25132* (2013.01); *G05B 2219/2637* (2013.01)

(58) Field of Classification Search
CPC .......... C12Q 1/6851; C12Q 2545/113; C12Q 2537/165; C12Q 2545/101; C12Q 2545/107; G06F 1/266; G06F 2200/261; G06F 1/26; G06F 1/3203; G06F 1/3287; H01R 2103/00; H01R 25/003; H01R 29/00; H01R 13/6675; H01R 2201/04; H01R 2201/06; H01R 24/22; H01R 27/02; H01R 13/6205; H02J 7/0055; H02J 1/00; H02J 1/10; H02J 7/0004; H02J 7/0068; H02M 2001/008; B01L 7/52
See application file for complete search history.

(56) References Cited

U.S. PATENT DOCUMENTS

| | | | |
|---|---|---|---|
| 7,921,309 B1 | 4/2011 | Isbister et al. | |
| 2005/0090940 A1 | 4/2005 | Pajakowski et al. | |
| 2007/0075680 A1* | 4/2007 | Chung et al. | 320/125 |
| 2007/0201104 A1* | 8/2007 | Kihara | 358/434 |
| 2010/0249965 A1* | 9/2010 | Rao et al. | 700/94 |
| 2013/0249717 A1* | 9/2013 | Johnson et al. | 341/100 |

OTHER PUBLICATIONS

International Search Report and Written Opinion issued in related application No. PCT/US2013/028194 on May 9, 2013.

* cited by examiner

*Primary Examiner* — Aditya Bhat
(74) *Attorney, Agent, or Firm* — Baker & Hostetler LLP (57) ABSTRACT

An apparatus for a circuit which allows a user to connect various adaptors to a common interface to provide a device with power and data signals. The circuit may provide a device, in which the circuit is incorporated, with the ability to discern whether a connected adaptor is providing power or data at any given time. If the adaptor is providing power at a particular moment, then the power/data circuit can identify that power is being provided and signal the device to accept power. When the adaptor is providing data at a particular moment, then the circuit can identify that power is being provided and signal the device to accept power. The circuit may include a power/data input, a vehicle connector, an internal power source connector, a reference voltage source, a comparator, and sensor.

17 Claims, 4 Drawing Sheets

APPARATUS FOR DATA SIGNAL TRANSMISSION THROUGH POWER CONNECTION

FIELD OF THE INVENTION

The invention relates generally to a diagnostic device having an interface for the transmission of power and data signals. More particularly, the invention relates to providing a circuit to allow for the transmission of power and data signals through a common interface of a diagnostic device.

BACKGROUND OF THE INVENTION

In many industries, diagnostic systems play an increasingly important role in manufacturing processes, as well as in maintenance and repair throughout the life of the equipment or product. Some diagnostic systems have become portable and benefit from multiple ways of powering the diagnostic device. Some such ways may include batteries (disposable or rechargeable), an AC power source (possibly connected to through an adaptor) to power the diagnostic device or charge rechargeable batteries, and/or a DC power source, often provided by a vehicle connected to the diagnostic device. The diagnostic devices also typically accommodate a variety of data connections. The data connections allow the diagnostic systems to receive and/or transmit data in a plurality of ways. However, a variety of data connections and power sources make the devices more costly and/or more difficult to manufacture. Additionally, the devices have a limited size, and fitting additional connections is difficult.

Accordingly, it is desirable to have an apparatus to provide diagnostic information to a user and which allows the user to provide the diagnostic device with power and data signals through a common interface to reduce costs and manufacturing complexity.

SUMMARY OF THE INVENTION

In accordance with one aspect of the invention, a diagnostic apparatus having a power connection interface configured for data signal transmission and power transmission includes an interface configured to receive an electrical connector, wherein the connector either transmits data signals or delivers electrical power, a processor configured to process the data signals, the interface further configured to receive data signals or deliver electrical power, a circuit to determine if the interface is receiving data signals or electrical power, and the circuit being configured to provide a trigger signal to the processor to indicate whether the interface is receiving data signals or electrical power.

The circuit may include a determiner configured to determine whether data signals or electrical power is being provided to the interface. The determiner may include a comparator configured to compare a voltage to electrical signals received by the interface to determine whether the received signals are data signals or electrical power is being provided to the interface. The comparator may include an op-amp having a voltage source. The output of the comparator may include the trigger signal. The circuit further may include an isolation component configured to prevent power from being provided to the circuit when receiving data signals. The interface may be configured to interface with at least one of a car, a car battery, a computer, and an AC voltage source. The diagnostic apparatus may include an adaptor configured to connect between the interface and at least one of a car, a car battery, a computer, and an AC voltage source.

In accordance with yet another aspect of the invention, a diagnostic apparatus having a power connection interface configured for data signal transmission and power transmission includes means for receiving an electrical connector within an interface, wherein the connector either transmits data signals or delivers electrical power, means for processing the data signals, means for determining if the interface is receiving data signals or electrical power, and means for providing a trigger signal to the means for processing to indicate whether the interface is receiving data signals or electrical power.

The means for determining may include a determiner configured to determine whether data signals or electrical power is being provided to the interface. The logic may include a comparator configured to compare a voltage to electrical signals received by the interface to determine whether the received signals are data signals or electrical power is being provided to the interface. The comparator may include an op-amp having a voltage source. The output of the comparator may include the trigger signal. The circuit further may include an isolation component configured to prevent power from being provided to the circuit when receiving data signals. The interface may be configured to interface with at least one of a car, a car battery, a computer, and an AC voltage source. The diagnostic apparatus may include an adaptor configured to connect between the interface and at least one of a car, a car battery, a computer, and an AC voltage source.

In accordance with still another aspect of the invention, a process of operating diagnostic apparatus having a power connection interface configured for data signal transmission and power transmission includes receiving an electrical connector within an interface, wherein the connector either transmits data signals or delivers electrical power, determining if the interface is receiving data signals or electrical power, and providing a trigger signal to indicate whether the interface is receiving data signals or electrical power.

The process may include comparing a voltage to electrical signals received by the interface to determine whether the received signals are data signals or electrical power is being provided to the interface. The process may include operating the diagnostic apparatus using the data signals or the electrical power being provided to the interface based in response to the trigger signal.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be

DETAILED DESCRIPTION

An aspect of the inventive apparatus for a circuit which allows a user to connect to a common interface to provide a device with power and data signals (power/data circuit). For exemplary purposes, the forgoing apparatus will be described in terms of its implementation within a portable vehicle diagnostic device. The example of the portable vehicle diagnostic device is in no way meant to be limiting, and it has been considered that the apparatus may be implemented in a variety of electronic devices. The portable vehicle diagnostic device can perform a combination of functions. Such functions may include diagnostic testing on vehicle components and systems. The portable vehicle diagnostic device may use its functionality to help a technician determine if there is a vehicle component failure and if so, which component has failed. In one aspect the portable vehicle diagnostic device may have a connection interface for providing the portable vehicle diagnostic device with power and/or data signals.

The power/data circuit within the portable vehicle diagnostic device may provide the device with the ability to discern whether a connection is providing power or data at any given time. If the connection is providing power at a particular moment, then the power/data circuit can identify that power is being provided and signal the portable vehicle diagnostic device to accept power. When the connection is providing data at a particular moment, then the power/data circuit can identify that power is being provided and signal the portable vehicle diagnostic device to accept power.

The invention will now be described with reference to the drawing figures, in which like reference numerals refer to like parts throughout. An aspect of the inventive apparatus is illustrated in FIG. 1, which illustrates a block diagram illustrating the portable vehicle diagnostic device incorporating an apparatus for data signal transmission through power connection (the power/data circuit).

Figure 1:
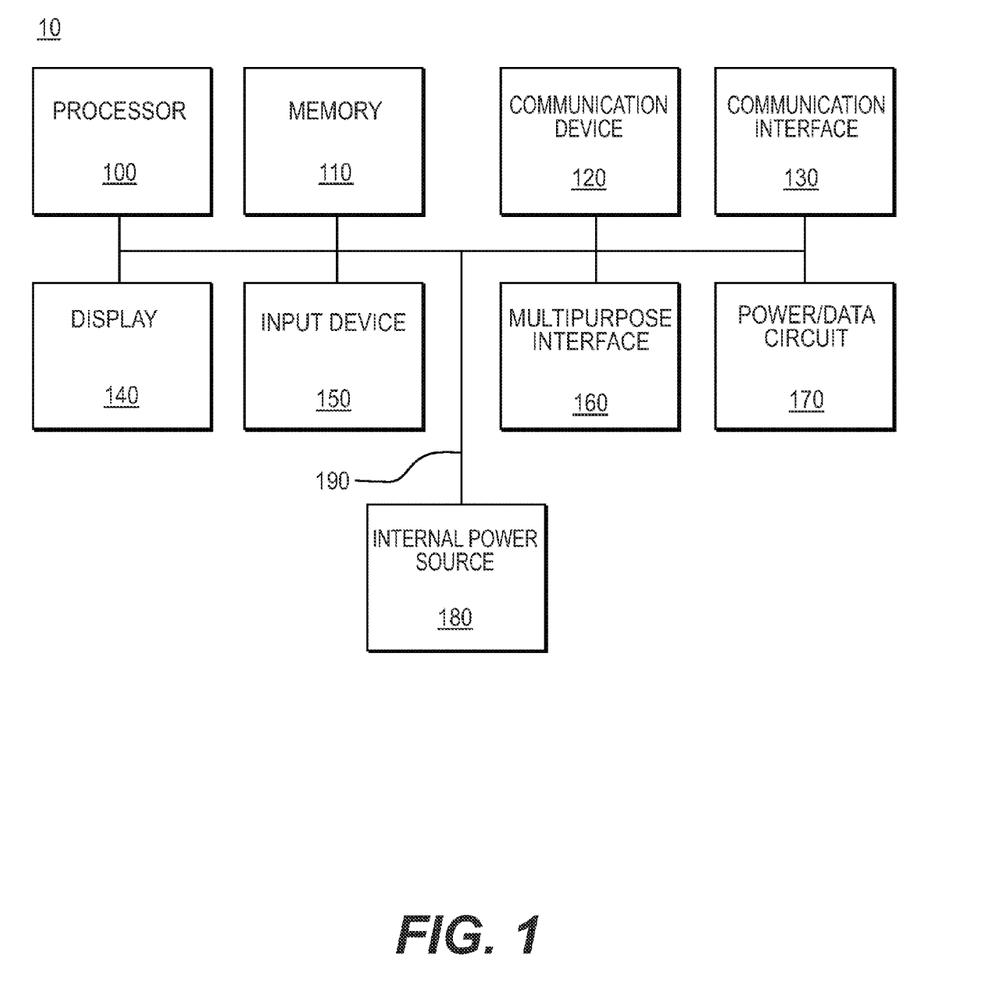
FIG. 1 is a block diagram illustrating a portable diagnostic device incorporating a circuit for data signal transmission through a power connection constructed according to an aspect of the invention.

FIG. 1 is a block diagram illustrating a portable diagnostic device incorporating an apparatus for data signal transmission through a power connection according to an aspect of the invention. In one aspect, the portable vehicle diagnostic device 10 may be a general computing device, such as a personal computer (PC), a UNIX workstation, a server, a mainframe computer, a personal digital assistant (PDA), smartphone, cellular phone, a tablet computer, a laptop computer, a netbook, a slate computer, or some combination of these. Alternatively, the portable vehicle diagnostic device 10 may be a specialized computing device, such as a vehicle diagnostic scan tool or the like. The diagnostic device may include a computer-readable medium. Programming code, such as source code, object code or executable code, stored on the computer-readable medium may be loaded into a memory 110 and processed by the processor 100 in order to perform the desired functions of the automotive diagnostic server system.

The portable vehicle diagnostic device 10 may include the processor 100, the memory 110, a communication device 120, a communication interface 130, a display 140, an input device 150, a multipurpose interface 160, a power/data circuit 170, an internal power source 180, and a communication bus 190.

The processor 100 of the portable vehicle diagnostic device 10 may be implemented in a number of different ways. In one aspect, the processor 100 may be a device that can read and process data such as program instructions stored in the memory 110 or received from an external source. Such a processor 100 may be implemented as a microcontroller. On the other hand, the processor 100 may be a collection of electrical circuit components built to interpret certain electrical signals and perform certain tasks in response to those signals. The processor 100 may be an integrated circuit, a field programmable gate array (FPGA), a complex programmable logic device (CPLD), a programmable logic array (PLA), an application specific integrated circuit (ASIC), or the like, or a combination thereof. Different complexities in the programming may affect the type or combination of the above to implement the processor 100.

The choice of memory 110 implemented in the portable vehicle diagnostic device 10 may be based on the software used. Other factors may also affect the choice of memory 110, such as price, speed, durability, size, portability, capacity, and re-programmability. Thus, the memory 110 of the portable vehicle diagnostic device 10 may be, for example, volatile, non-volatile, solid state, magnetic, optical, permanent, removable, writable, rewriteable, or read-only memory. If the memory 110 is removable, examples may include a CD, DVD, USB flash memory, memory sticks, memory cards (e.g., SD Flash memory cards) or the like which may be inserted into and removed from a CD and/or DVD reader/writer (not shown), a USB port (not shown), card reader or the like. The reader/writer may be integral or peripherally connected to the portable vehicle diagnostic device 10.

In various aspects, the portable vehicle diagnostic device 10 may be coupled to a communication network 200 (see FIG. 2) by way of the communication device 120. In various aspects the communication device 120 can incorporate any combination of devices, as well as any associated software or firmware configured to couple processor-based systems, such as modems, network interface cards, serial buses, parallel buses, LAN or WAN interfaces, wireless or optical interfaces and the like, along with any associated transmission protocols, as may be desired or required by the design.

Working in conjunction with the communication device 120, the communication interface 130 can provide the hardware needed for either a wired or wireless connection. For example, the communication interface 130 may include a connector or port for an On-Board Diagnostics (OBD), Ethernet, serial, parallel, or other physical connection. In other aspects, the communication interface 130 may include an antenna for sending and receiving wireless signals for various protocols, such as, Bluetooth, Wi-Fi, ZigBee, cellular telephony, wireless broadband (e.g., CDMA-1 (EVDO), GSM (GPRS/EDGE), UMTS/WCDMA/3G/FOMA/T-CDMA (HSPDA, HSUPA, HSPA, HSPA+), LTE, Mobile WiMax, and the like), and other radio frequency (RF) protocols. The portable vehicle diagnostic device 10 can include one or more communication interfaces 130 designed for the same or different types of communication. Further, the communication interface 130 itself can be designed to handle more than one type of communication.

Additionally, an aspect of the portable vehicle diagnostic device 10 may communicate information to a user through a display 140 and request user input through the input device 150 by way of an interactive, menu-driven, visual display-based user interface, graphical user interface (GUI) or the like. Alternatively, the communication may be text based only, or a combination of text and graphics. The user interface may be executed, for example, on a personal computer (PC) with a mouse and keyboard, with which the user may interactively input information using direct manipulation of the GUI. Direct manipulation may include the use of a pointing device, such as a mouse or a stylus, to select from a variety of selectable fields, including selectable menus, drop-down menus, tabs, buttons, bullets, checkboxes, text boxes, and the like. Nevertheless, various aspects of the invention may incorporate any number of additional functional user interface schemes in place of this interface scheme, with or without the use of a mouse or buttons or keys, including for example, a trackball, a scroll wheel, a touch screen or a voice-activated system.

The portable vehicle diagnostic device 10 may also include a multipurpose interface 160 which may accept various types of connections, connection adaptors and/or handle various kinds of inputs or signals. The multipurpose interface 160 may also interact with various types of adaptors or various sized adaptors. In some instances, each type of supported adaptor may connect to one of multiple connectors of the multipurpose interface 160. Other aspects may allow for the multipurpose interface 160 to include a single connector suitable to accept multiple adaptors. For such an aspect, the multipurpose interface 160 may include components that self-configure to the adaptor to make the proper connection for the adaptor being used, for example, like a card reader that is capable of accepting various brands, sizes, and configurations of memory cards. The multipurpose interface 160 may also be able to connect to both power adaptors and data adaptors.

It is noted that the multipurpose connector 160 may incorporate other elements of the portable vehicle diagnostic device 10. For example, the communication interface 130 may be a separate or integral part of the multipurpose interface 160.

The power/data circuit 170 may be another feature of the portable vehicle diagnostic device 10. The power/data circuit 170 may be able to distinguish between power and data signals provided at one or more of the interfaces 130, 160. To determine the type of signal being received by the portable vehicle diagnostic device 10, the power/data circuit 170 may compare the incoming signal to one or more other signals within the portable vehicle diagnostic device 10. Based on these comparisons, the power/data circuit 170 can generate a signal identifying whether the received signal is power or data.

An internal power source 180 may be included in the portable vehicle diagnostic device 10. The inclusion of an internal power source 180, such as disposable or rechargeable batteries, can provide the portable vehicle diagnostic device 10 with greater portability and freedom of motion. A user may be provided with a limited amount of time to use the portable vehicle diagnostic device 10 untethered from a power source, allowing the user to use the device when a power source is unavailable. The internal power source 180 also frees the multipurpose interface 160 for data use. Alternatively, when the internal power source 180 needs to be recharged, the multipurpose interface 160 may be used to accept power for recharging.

The different components of the portable vehicle diagnostic device 10 can be linked together, to communicate with each other, by the communication bus 190. In various aspects, any combination of the components can be connected to the communication bus 190 while other components may be separate from the portable vehicle diagnostic device 10 and may communicate to the other components by way of the communication interface 130. For example, as discussed herein, the memory 110, can be external to the portable vehicle diagnostic device 10, and the memory 110 may be connected to the portable vehicle diagnostic device 10 through an appropriate port embodied in the communication interface 130.

Figure 2:
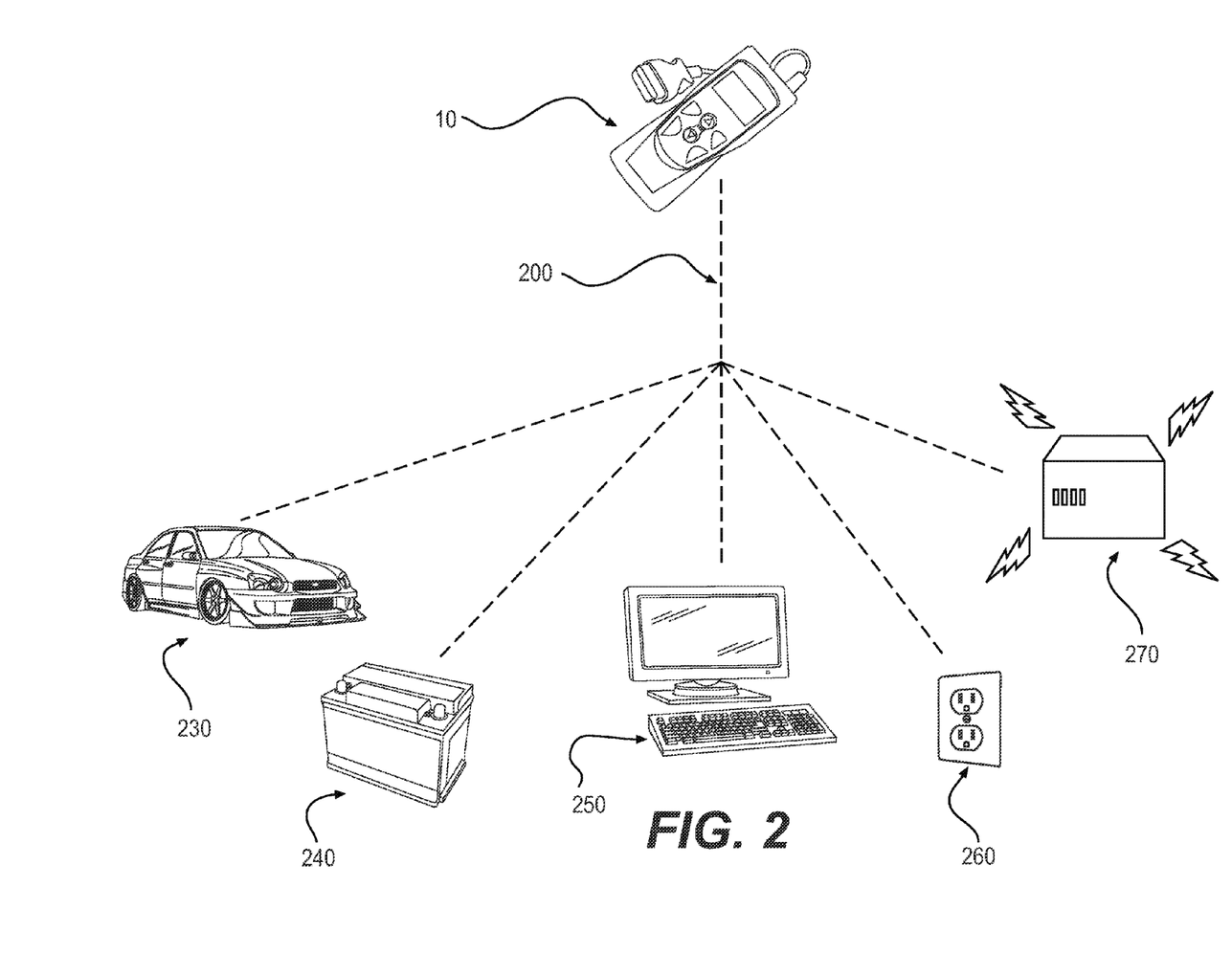
FIG. 2 is a schematic diagram illustrating a plurality of connections to an apparatus for data signal transmission through a power connection constructed according to an aspect of the invention.

FIG. 2 is a schematic diagram illustrating a plurality of connections to an apparatus for data signal transmission through a power connection constructed according to an aspect of the invention. In particular, the portable vehicle diagnostic device 10 may communicate with other devices of a diagnostic system or a test subject over the communication network 200 via the communication interface 130 and the multipurpose interface 160. The communication network 200 can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; cellular system; satellite system; a combination of any number of distributed processing networks or systems or the like.

The multipurpose interface 160 may connect the portable vehicle diagnostic device 10 to a plurality of external devices. The connections may be wired connections including connecting devices via a data cable, power cable, or combination data and power cable. Alternatively the data or power can be transmitted between the external devices and the portable vehicle diagnostic device 10 via wireless connections. The multipurpose interface 160 may connect the portable vehicle diagnostic device 10, for example, to electronic control units (ECU's) 230 of a vehicle, a vehicle battery 240, an external computing device 250, a wired power source 260, a wireless power source 270 (such as an electromagnetic induction source or an electromagnetic radiation source). As noted above, the multipurpose interface 160 may connect to any one of the plurality of external devices through an adaptor.

Figure 3:
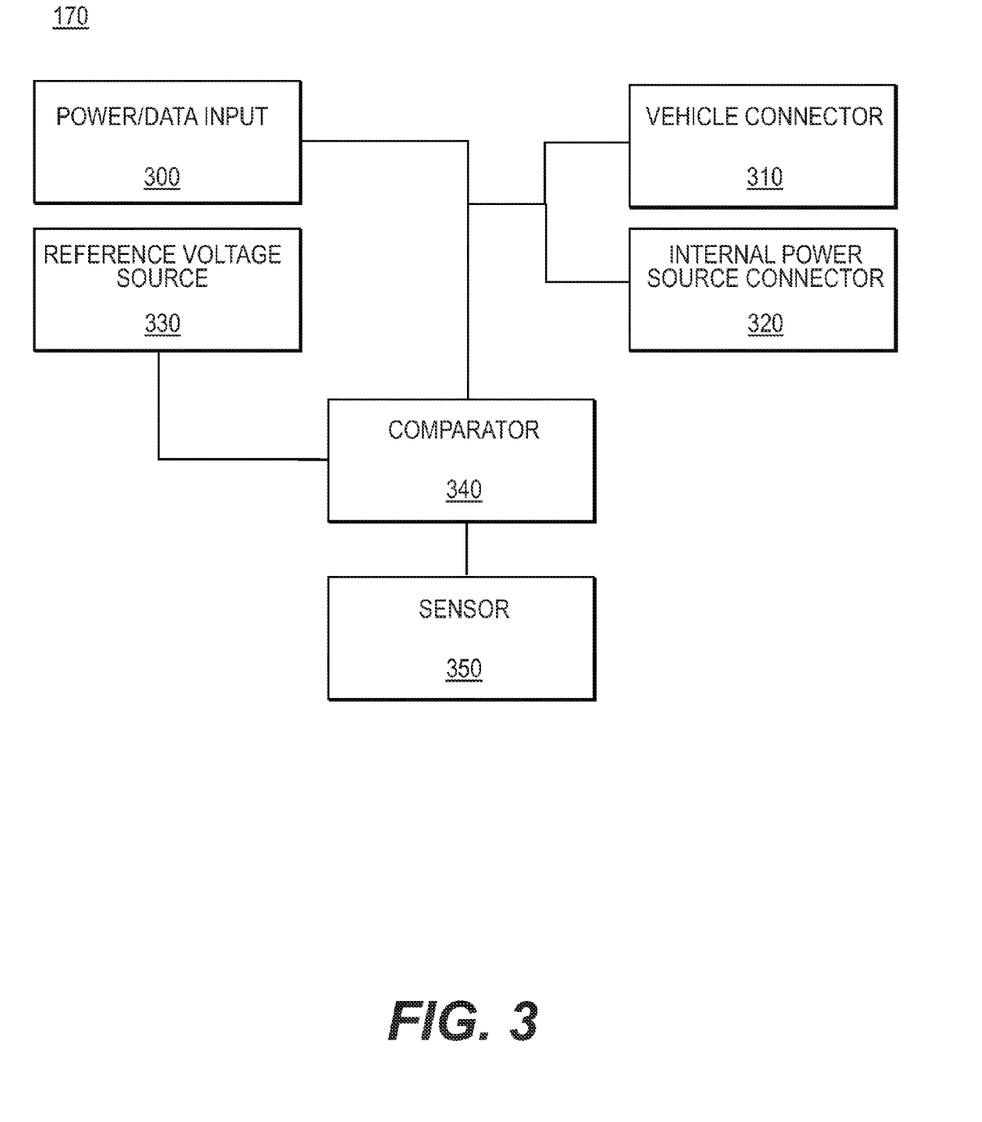
FIG. 3 is a block diagram illustrating an apparatus for data signal transmission through a power connection constructed according to an aspect of the invention.

FIG. 3 is a block diagram illustrating an apparatus for data signal transmission through a power connection according to an aspect of the invention. The above-noted power/data circuit 170 may be implemented to include various components including a power/data input 300, a vehicle connector 310, an internal power source connector 320, a reference voltage source 330, a comparator 340, and sensor 350.

The power/data input 300 can include the multipurpose interface 160 for connecting the power/data circuit 170 to an external power or data source. The power/data interface 160 may further be connected to other components. Such components may include a combination of electrical components such as wire leads, current limiting components, and ground connections. The combination of these further components allows the power/data input 300 to provide either a power signal or a data signal (or to interact with various adaptors as described herein). In another aspect, the power/data input 300 may include electrical components, such as a switch, whereby a frequency modulated output data signal may be applied from the power/data input 300 to the connected adaptor.

Also included in the power/data circuit 170 may be the vehicle connector 310. In some aspects, the vehicle connector 310 may include a wire lead that is in communication with a dedicated vehicle connector, or that is in communication with the communication interface 130 or with the multipurpose interface 160. Moreover, the vehicle connector 170 may include a voltage limiting device implemented to allow the power/data circuit 170 to determine when the portable vehicle diagnostic device 10 is connected to a vehicle. If the signal on the power/data circuit 170 is interpreted as being connected to the vehicle, and therefor powered by the vehicle, the multipurpose interface 160 is available for a data transmission.

In some aspects, the internal power source connector 320 may be incorporated into the vehicle connector 310. The connectors 310, 320, may share components as they serve the same purpose, to provide the power/data circuit 170 with a signal indicating that the portable vehicle diagnostic device 10 is being powered and that the multipurpose interface 170 is available for data. It is also considered that the internal power source connector 320 may include a separate portion of the power/data circuit 170, where it includes components similar but separate to those of the vehicle connector 310.

To determine whether the power/data circuit 170 is connected to a power source via the multipurpose interface 160, or to the vehicle or the internal power source, a determination must be made based on the measurement of the signal on the circuit. To do so, the reference voltage source 330 provides the power/data circuit 170 with a predetermined voltage for comparison with the signal on the power/data circuit 170. The reference voltage provided may be such that it is of a voltage level that is considered to be between expected levels of voltage for a power signal and a data signal. For example, a power signal may be expected to be 5V or greater, while a data signal may be expected to be 2.5V or less. In such an example, the desired reference voltage may be greater than 2.5V but less than 5V, such as 3.75V. This example is not meant to be limiting. It is considered that the voltage levels of any of the signals may be different from the example herein, and it is not necessary that the power signal be greater than the data signal.

The comparator 340 may be tasked with comparing the reference signal and the signal on the power/data circuit 170. Depending on the structure of the comparator 340, one of the signals, either the reference signal or the signal on the power/data circuit 170, may be allowed to pass through. The signal that is allowed to pass through the comparator is the signal that will be indicative of whether the multipurpose device 160 is connected to a power source or a data source. To continue with the example started above, if the comparator 340 is constructed to allow the higher voltage to pass through, then if the reference signal passes through, the signal would indicate that the power/data circuit is connected to a data source. On the other hand, if the higher voltage is the signal from the power/data circuit 170, then the signal that passed through the comparator 340 indicates that the power/data circuit 170 is connected to a power source.

The signal that passes through the comparator 340, may be passed on to the sensor 350. The voltage of the signal that reaches the sensor 350 may be received and converted to a signal that can be understood by the processor 100 to indicate that data signals or electrical power is being received. In this regard, the processor 100 may execute protocol and implement operations such that the portable vehicle diagnostic device 10 is prepared to receive data signals or receive electrical power at the multipurpose interface 160.

Figure 4:
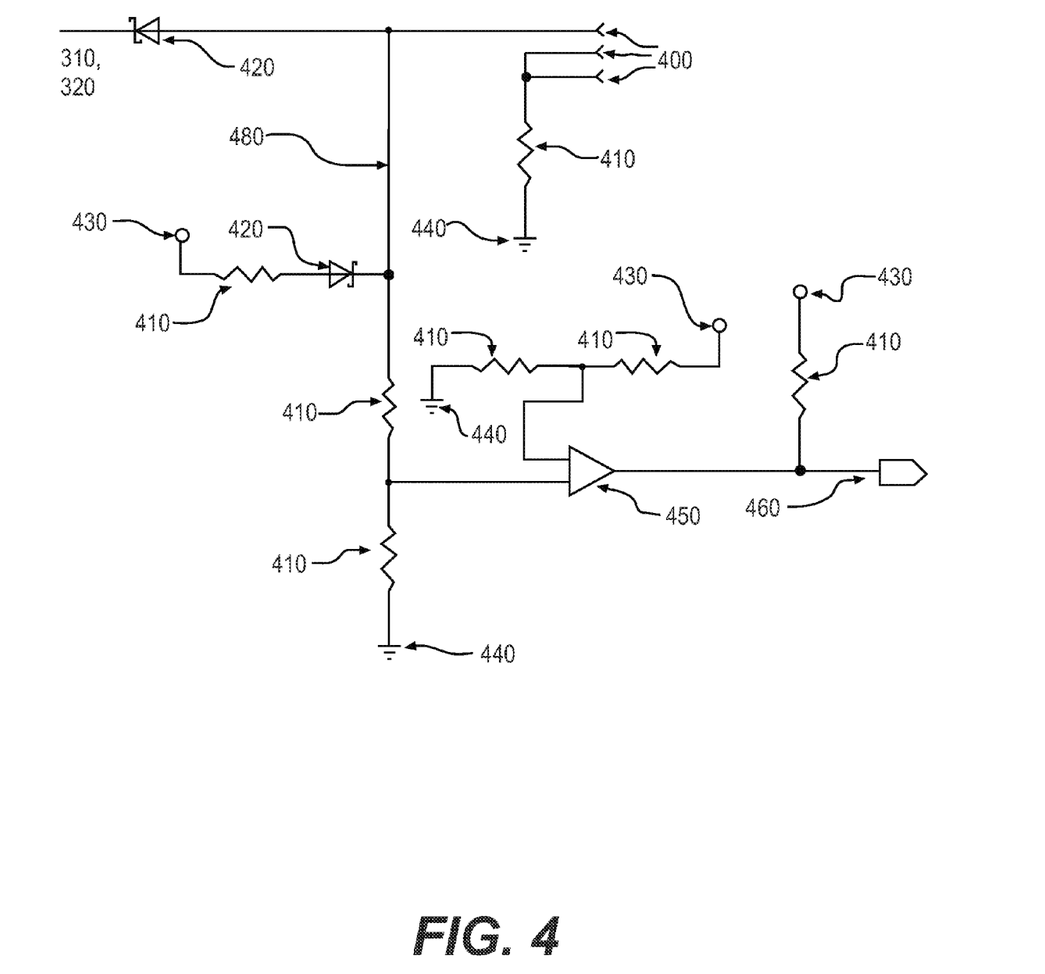
FIG. 4 is a schematic diagram illustrating a circuit for data signal transmission through power connection constructed according to an aspect of the invention.

FIG. 4 is a schematic diagram illustrating a circuit for data signal transmission through a power connection constructed according to an aspect of the invention. In one aspect, the power/data circuit 170 may be implemented to include various electronic components that may include combinations of a lead 400, resistors 410, diodes 420, a voltage source 430, ground points 440, a logic gate 450, a trigger sensor 460, and a main line 480, which may connect many of the components.

At one end of the power/data circuit 170 implementation shown in FIG. 4 may be at least two open ended leads 400. These open ended leads 400 may be part of, connected to, and/or associated with the multipurpose interface 160. If utilized, an adaptor may be connected to the multipurpose interface 160 and accordingly may connect to the rest of the power/data circuit 170.

In some implementations, the multipurpose interface 160 may include pins associated with a connector. A particular one of the open ended leads 400 may correspond to a respective pin of the multipurpose interface 160. Similarly, if additional open ended leads 400 are provided, then these additional open ended leads 400 may correspond to other respective pins of the multipurpose interface 160.

For a configuration of two or more open ended leads 400, one or more of the open ended leads 400 may be connected to a resistor 410, respectively. The resistor 410 may be a pull-down resistor, and therefore connected to the ground point 440 at the other end.

The other open ended lead 400 may be connected to another portion of the power/data circuit 170. When a data adaptor is connected to the multipurpose interface 160, and thereby connected to the open ended leads 400, the connector may short one or more of the grounded open ended leads 400 with the other open ended lead 400. This may aid in keeping the voltage of the data signal at a level that is low enough for the comparator 340 to distinguish between the power and data signals.

At another end of the power/data circuit 170 is another open ended lead that may be connected to the vehicle connector 310 and/or the internal power source 320. Connected along this open ended lead and positioned between the open ended lead's connection to the vehicle connector 310, or the internal power source 320, and any other component of the power/data circuit 170 is a diode 420.

The diode 420 is arranged to prevent a current flow from the power source 320 or vehicle connector 310 into the power/data circuit 170 when, for example, the portable vehicle diagnostic device 10 is being powered via the vehicle connector or the internal power source. Also, in the same situation, when a data adaptor is connected to the multipurpose interface 170, the diode 420 may have a higher voltage on the cathode side than on the anode side when data signals are being provided, thereby preventing the data signals from taking the wrong path on the power/data circuit 170. The orientation of the diode 420 is such that the cathode side faces the vehicle connector 310 or the internal power source 320, and the anode side faces the rest of the power/data circuit 170. In one aspect, the diode may be a Schottky diode.

The open ended leads 400 connected to the power/data circuit 170 may connect at a node and combine into the main line 480. Also connected to the main line 480 may be another resistor 410. This resistor 410 may be configured in a pull-up arrangement connected on its other side to a voltage source 430. The pull-up resistor 410 may be connected to a voltage source 430 of various levels, however for purposes of the above-noted example, the voltage source 430 may generate 5V. The pull-up resistor 410 may be connected to the main line 480 through the diode 420, which in one aspect may again be a Schottky diode, connected to the resistor 410 on the anode side and the main line 480 on the cathode side.

The pull-up resistor may pull-up low or no voltage levels on the main line 480 to levels that the power/data circuit 170 may be expected to meet or maintain. The Schottky diode may allow the pull-up resistor to affect voltage levels on the main line 480 that are lower than the pull-up voltage. However, if the voltage on the main line 480 is greater than the pull-up voltage, then the Schottky diode will change to a nonconductive state, electrically separating the pull-up resistor from the main line 480.

To avoid damage to the comparator 450, another resistor 410 (protective resistor), may be placed along the main line 480 between the comparator 450 and the node where the open ended leads 400 connect. This avoids the situation where the voltage along the main line 480 becomes more than some of the components of the power/data circuit 170 can handle and thus reduces the possibility of damage to the components.

Further along the main line 480, another resistor 410 may connect to the main line 480 on one side and to another ground point 440 on its other side. This configuration of a pull-down resistor may also be implemented to protect components of the power/data circuit 170. In this instance, the pull-down resistor may be selected such that its level of impedance is high enough to deter signals within a voltage range manageable for the power/data circuit 170 from going to the ground point 440, but low enough so that when the voltage level gets too high, the path to the ground point 440 is not so impeded that the damaging voltage is deterred toward the vulnerable components.

The logic gate 450 may be connected to the main line 480 between the protective resistor and the pull-down resistor. The main line 480 may transmit one of the inputs to the logic gate 450 and thus be connected to an input pin of the logic gate 450. An example of the logic gate 450 that may be implemented in the power/data circuit 170 is the comparator 340 as described herein. More specifically, the logic gate 450 may be implemented as an operational-amplifier.

The input of another pin of the logic gate 450 may be the reference signal which is generated by a combination of components which outputs the reference signal. In one aspect, the signal may be generated by another voltage source 430 (reference voltage source), which may be divided by a pair of resistors 410. The reference voltage source may be connected to the end of one resistor 410, which is in turn may be connected to the end of another resistor 410, which may be further connected to another ground point 440. The pin of the logic gate 450 accepting the reference signal may be connected between the pair of resistors 410.

The logic gate 450 may provide an output to the trigger sensor 460. As described herein, the output of the logic gate 450 may be or may be representative of the type of signal provided to the power/data circuit 170 through the multipurpose interface 160. The trigger sensor 460 may receive this output, and depending on the output received, translate the output into a signal that may be recognized and processed by, for example, the processor 100.

Another resistor 410 may be connected on one end between the output of the logic gate 450 and the trigger sensor 460, and on the other end to another voltage source 430. This represents another pull-up resistor setup connected between the comparator 340 and the trigger sensor 460. The purpose of this pull-up resistor is that in case the voltage is too low for the trigger sensor 460 to sense, then the pull-up resistor can raise the voltage to the appropriate level for a lower voltage output from the logic gate 450.

Accordingly, the apparatus described herein may provide diagnostic information to a user and may allow the user to provide the diagnostic device with power and data signals through a common interface to reduce costs and manufacturing complexity. The circuit allows a user to connect to a common interface to provide the device with power and data signals (power/data circuit). For exemplary purposes, the foregoing apparatus was described in terms of its implementation within a portable vehicle diagnostic device. However, the example of the portable vehicle diagnostic device is in no way meant to be limiting, and it has been considered that the apparatus may be implemented in a variety of electronic devices. The portable vehicle diagnostic device can perform a combination of functions. Such functions may include diagnostic testing on vehicle components and systems.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic apparatus having a power connection interface configured for data signal transmission and power transmission comprising:
   an interface configured to receive an electrical connector;
      wherein the connector either transmits data signals or delivers electrical power on a single common input line;
   a processor configured to process the data signals;

the interface further configured to receive data signals or deliver electrical power from the single common input line;

a circuit to determine if the interface is receiving data signals or electrical power from the single common input line; and the circuit being configured to provide a trigger signal to the processor to indicate whether the interface is receiving data signals or electrical power on the single common input line, wherein the diagnostic apparatus comprises a vehicle diagnostic device configured to implement diagnostic testing on vehicle components and systems; and wherein the circuit comprises a determiner configured to determine whether data signals or electrical power is being provided to the interface.

2. The diagnostic apparatus of claim 1 wherein the determiner comprises a comparator configured to compare a voltage to electrical signals received by the interface to determine whether the received signals are data signals or electrical power is being provided to the interface.

3. The diagnostic apparatus of claim 2 wherein the comparator comprises an op-amp having a voltage source.

4. The diagnostic apparatus of claim 2 wherein the output of the comparator comprise the trigger signal.

5. The diagnostic apparatus of claim 1 wherein the circuit further comprises an isolation component configured to prevent power from being provided to the circuit when receiving data signals.

6. The diagnostic apparatus of claim 1 wherein the interface is configured to interface with at least one of a car, a car battery, a computer, and an AC voltage source.

7. The diagnostic apparatus of claim 1 further comprising an adaptor configured to connect between the interface and at least one of a car, a car battery, a computer, and an AC voltage source.

8. The diagnostic apparatus of claim 1 wherein the diagnostic apparatus comprises a vehicle diagnostic device configured to implement diagnostic testing on vehicle components and systems;

wherein the determiner comprises a comparator configured to compare a voltage to electrical signals received by the interface to determine whether the received signals are data signals or electrical power is being provided to the interface;

wherein the comparator comprises an op-amp having a voltage source;

wherein the output of the comparator comprise the trigger signal; and wherein the circuit further comprises an isolation component configured to prevent power from being provided to the circuit when receiving data signals.

9. A diagnostic apparatus having a power connection interface configured for data signal transmission and power transmission comprising:

means for receiving an electrical connector within an interface, wherein the connector either transmits data signals or delivers electrical power on a single common input line;

means for processing the data signals;

means for determining if the interface is receiving data signals or electrical power from the single common input line; and means for providing a trigger signal to the means for processing to indicate whether the interface is receiving data signals or electrical power from the single common input line, wherein the diagnostic apparatus comprises a vehicle diagnostic device configured to implement diagnostic testing on vehicle components and systems; and wherein the means for determining comprises a determiner configured to determine whether data signals or electrical power is being provided to the interface.

10. The diagnostic apparatus of claim 9 wherein the determiner comprises a comparator configured to compare a voltage to electrical signals received by the interface to determine whether the received signals are data signals or electrical power is being provided to the interface.

11. The diagnostic apparatus of claim 10 wherein the comparator comprises an op-amp having a voltage source.

12. The diagnostic apparatus of claim 10 wherein the output of the comparator comprise the trigger signal.

13. The diagnostic apparatus of claim 9 further comprising a circuit, wherein the circuit comprises an isolation component configured to prevent power from being provided to the circuit when receiving data signals.

14. The diagnostic apparatus of claim 9 wherein the interface is configured to interface with at least one of a car, a car battery, a computer, and an AC voltage source.

15. The diagnostic apparatus of claim 9 further comprising an adaptor configured to connect between the interface and at least one of a car, a car battery, a computer, and an AC voltage source.

16. A process of operating diagnostic apparatus having a power connection interface configured for data signal transmission and power transmission comprising:

receiving an electrical connector within an interface, wherein the connector either transmits data signals or delivers electrical power on a single common input line;

determining if the interface is receiving data signals or electrical power from the a single common input line;

comparing a voltage to electrical signals received by the interface to determine whether the received signals are data signals or electrical power is being provided to the interface; and providing a trigger signal to indicate whether the interface is receiving data signals or electrical power from the single common input line;

wherein the diagnostic apparatus comprises a vehicle diagnostic device configured to implement diagnostic testing on vehicle components and systems.

17. The process of claim 16 further comprising operating the diagnostic apparatus using the data signals or the electrical power being provided to the interface based in response to the trigger signal.

* * * * *